United States Patent
Zoelch et al.

(10) Patent No.: US 11,929,847 B2
(45) Date of Patent: Mar. 12, 2024

(54) METHOD FOR CONTROLLING A WORKLOAD OF A BUS SYSTEM OF A MEANS OF TRANSPORT, AND BUS SYSTEM AND MEANS OF TRANSPORT

(71) Applicant: Bayerische Motoren Werke Aktiengesellschaft, Munich (DE)

(72) Inventors: Ruediger Zoelch, Oberschleissheim (DE); Matthias Traub, Tübingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/601,981

(22) PCT Filed: Feb. 7, 2020

(86) PCT No.: PCT/DE2020/100080
§ 371 (c)(1),
(2) Date: Oct. 7, 2021

(87) PCT Pub. No.: WO2020/207520
PCT Pub. Date: Oct. 15, 2020

(65) Prior Publication Data
US 2022/0217013 A1 Jul. 7, 2022

(30) Foreign Application Priority Data
Apr. 11, 2019 (DE) ...................... 10 2019 109 597.2

(51) Int. Cl.
*H04L 12/40* (2006.01)
(52) U.S. Cl.
CPC .. *H04L 12/40019* (2013.01); *H04L 12/40032* (2013.01); *H04L 2012/40215* (2013.01)
(58) Field of Classification Search
CPC ......... H04L 12/40019; H04L 12/40032; H04L 12/40176; H04L 2012/40176;
(Continued)

(56) References Cited

U.S. PATENT DOCUMENTS 7,299,284 B2 * 11/2007 McKinnon, III ... H04L 41/5067
 709/224
11,356,168 B2 * 6/2022 Schwartz .............. H04W 72/20
(Continued)

FOREIGN PATENT DOCUMENTS

CN 103618658 B 8/2016
WO 2017123334 A1 7/2017

OTHER PUBLICATIONS

International Search Report corresponding to International Patent Application No. PCT/DE2020/100080, dated Apr. 28, 2020 (10 pages).

(Continued)

*Primary Examiner* — Stephen J Clawson
(74) *Attorney, Agent, or Firm* — Maginot, Moore & Beck LLP

(57) ABSTRACT

A method, a bus system, and a transportation means control a utilization of the bus system. The method includes determining a first piece of information representing a current and/or a future utilization of the bus system, and determining a second piece of information representing respective data transmission time periods for a plurality of bus subscribers which transmit data by means of the bus system, as a function of the first piece of information. The method also includes transmitting the second piece of information to the plurality of bus subscribers, and adjusting respective data transmission time periods for the plurality of bus subscribers by the respective bus subscribers, as a function of the second piece of information, and transmitting data by the plurality of bus subscribers within the respective adjusted data transmission time periods by means of the bus system.

18 Claims, 2 Drawing Sheets

(58) Field of Classification Search
CPC . H04L 2012/40215; H04L 2012/40267; H04L 43/0876
See application file for complete search history.

(56) References Cited

U.S. PATENT DOCUMENTS

| | | | |
|---|---|---|---|
| 2006/0253853 A1* | 11/2006 | Jiang | G06F 9/4887 718/100 |
| 2007/0268839 A1* | 11/2007 | Keating | H04L 12/2856 370/254 |
| 2008/0025341 A1* | 1/2008 | Rao | H04W 72/048 370/468 |
| 2011/0320588 A1* | 12/2011 | Raleigh | H04W 28/0247 709/224 |
| 2012/0164989 A1* | 6/2012 | Xiao | H04L 67/125 715/764 |
| 2014/0362688 A1* | 12/2014 | Zhang | H04L 41/5067 370/230 |
| 2015/0055473 A1 | 2/2015 | Moriya | |
| 2016/0218828 A1* | 7/2016 | Hammerschmidt | F02D 41/222 |
| 2017/0181027 A1* | 6/2017 | Raleigh | H04W 24/02 |
| 2022/0225127 A1* | 7/2022 | Imran | H04W 24/02 |

OTHER PUBLICATIONS

German Search Report corresponding to German Patent Application No. 10 2019 109 597.2, dated Nov. 26, 2019 (6 pages).
"Time-Triggered Protocol—Wikipedia—Version of Feb. 18, 2019", Feb. 18, 2019 (Feb. 18, 2019), XP055688461 URL:https://en.wikipedia.org/w/index.php?title=Time-Triggered_Protocol&oldid=883888677.

\* cited by examiner

METHOD FOR CONTROLLING A WORKLOAD OF A BUS SYSTEM OF A MEANS OF TRANSPORT, AND BUS SYSTEM AND MEANS OF TRANSPORT

The present application is the U.S. national phase of PCT Application PCT/DE2020/100080 filed on Feb. 7, 2020, which claims priority of German patent application No. 102019109597.2 filed on Apr. 11, 2019, which is incorporated herein by reference in its entirety.

TECHNICAL FIELD

The present invention relates to a method, a bus system, and a transportation means for controlling a utilization of the bus system of the transportation means.

BACKGROUND

Modern transportation means usually have a large number of different control units, which are generally connected to one another in terms of information technology, by means of bus systems known from the prior art, for example, CAN, MOST, LIN, FlexRay, Ethernet bus systems, etc. In addition, a plurality of separate sub-buses or subnetworks is frequently used in modern transportation means, in order, for example, to limit data communication to logical groups of control units (for example, control units which fulfill a common function, such as control units of a drivetrain or a comfort system of a transportation means) essentially to the respective logical groups. Alternatively or additionally, the use of sub-buses means that different bus technologies may also be used in the respective sub-buses, due to different requirements placed on the sub-buses (with respect to required data transmission rates, maximum costs, etc.). In order to ensure inter-sub-bus data communication between control units of different sub-buses, in the prior art, for example, gateway control units are used which are configured to network a plurality of sub-buses according to predefined data transmission rules.

The bus systems which can be used in transportation means may respectively have different technology-related limits with respect to their maximum transmission bandwidth. A transmission quality (quality of service) of these bus systems is influenced, inter alia, by a respective utilization (bus load) of the bus systems. In an unfavorable bus load situation, negative effects may occur with respect to the transmission quality, which may manifest themselves, inter alia, in fluctuations in the accuracy (jitter) of the transmission rate of cyclic data communication, or in a complete suppression of an attempt to transmit (i.e., a loss of a bus message) by a control unit. A desired transmission quality of a respective bus system is generally ensured by means of different modeling approaches. In the context of a CAN bus system, a widely used modeling approach is, for example, to specify an upper bus load limit of, for example, 50%. This bus load limit may be specified, inter alia, on the basis of theoretically or empirically determined "worst-case scenarios." The resulting modeling thus often leads to a conservative, i.e., inefficient, utilization of a respective bus system. In addition, such conservative modeling during the design phase of a bus system, and later measurement of the utilization in an actual deployment of the bus system, may result in highly different results with respect to the utilization of the bus system. However, more precise modeling in an early design phase of the bus system during the development of transportation means is usually possible only to a limited extent.

SUMMARY

For this reason, it is an object of embodiments described herein to alleviate this and other disadvantages of the prior art by means of a method, a bus system, and a transportation means for controlling a utilization of the bus system of the transportation means.

According to a first aspect, a method for controlling a utilization of a bus system of a transportation means is proposed. The transportation means may, for example, be a road vehicle (for example, motorcycle, passenger vehicle, van, truck) or a rail vehicle or an aircraft/airplane or a watercraft. In a first step of the method, a first piece of information representing a current and/or a future utilization of the bus system is determined. For this purpose, the transportation means may preferably comprise a bus load manager, which may be part of an existing control unit or an independent control unit of the transportation means, and which may be connected in terms of information technology to one or several bus systems of the on-board electrical system of the transportation means. The control unit of the transportation means comprising the bus load manager may preferably be a gateway control unit. The bus system may be an automotive bus system, in particular an Ethernet bus system, and preferably a CAN bus system. Furthermore, the bus system may also be a MOST system, a LIN system, a FlexRay system, or another bus system which is suitable for use in transportation means. In addition, the transportation means may comprise a plurality of bus systems or sub-buses, which preferably may be connected to one another in terms of information technology via one or several gateway control units. Furthermore, the respective sub-buses may be based on one and the same bus technology and/or on different bus technologies. For the purposes of a simplified description, the method according to the present invention is to be described representatively below on the basis of the CAN bus system, unless stated otherwise, without thereby limiting the method to this specific bus system.

The determination of the current and/or future utilization of the bus system may be carried out by means of a first evaluation unit, which is preferably a component of the bus manager. The first evaluation unit may be connected in terms of information technology to the CAN bus system by means of a first CAN bus interface. Furthermore, the first evaluation unit may be configured to carry out the method steps described herein on the basis of a computer program implementing the method steps. To determine the current and/or future utilization of the bus system, the first evaluation unit may first perform a measurement of an actual utilization of the bus system over a predefined time period. For this purpose, the first evaluation unit may receive all, or a suitable portion, of the data communication taking place on the bus system within the predefined time period, and store said data communication in the form of data in an internal and/or external memory unit which is connected to the first evaluation unit. The data recorded in this manner may subsequently be evaluated by the first evaluation unit by means of a suitable algorithm, in order to identify corresponding phases of an increased utilization of the bus system. The evaluation by means of the evaluation unit may take place either virtually in parallel with a running recording of the data communication, or downstream of a recording of the data communication. In this manner, the first evaluation unit may be used, in particular, to identify time periods for regularly recurring, i.e., in particular cyclic, data transmissions. In addition to such cyclic data transmissions, many of the aforementioned bus technologies also enable event-controlled data transmissions, the respective transmission time points of which may be linked to corresponding events which are internal to the vehicle and/or external to the vehicle. An event internal to the vehicle may, for example, be the actuation of an operating element in the transportation means by a user of the transportation means, while an event external to the vehicle may, for example, be falling below a predefined threshold value for ambient brightness, which may be detected by a light sensor of the transportation means and used subsequently, for example, for automatically activating headlights of the transportation means. In both cases, for detecting the respective events, a respective sensor may transmit a piece of information representing the respective events to respective receiver control units in the transportation means, by means of data communication via the bus system. Since such an event-controlled data transmission may naturally take place very irregularly, in contrast to cyclic data transmission, a prediction of event-controlled data transmissions on the basis of an evaluation of the data communication recorded in the predefined time period by the first evaluation unit is thus possible only to a limited extent. By additionally detecting respective events corresponding to the data transmission (for example, by evaluating the content of transmitted data) in the first evaluation unit, respective events can be associated with a corresponding, subsequent data transmission on the bus system by means of the first evaluation unit. In this manner, it is also possible to predict future utilization of the bus system with respect to event-controlled data transmissions, at least to a limited extent.

Alternatively or additionally to determining the current and/or future utilization of the bus system on the basis of a measurement in a predefined time period, the first evaluation unit may determine the current and/or a future utilization of the bus system on the basis of previously determined statistical data about the utilization of the bus system. These statistical data may be determined, for example, in a development phase of the transportation means by means of a corresponding test vehicle. The statistical data may subsequently be stored in the memory unit connected to the first evaluation unit during the production of the transportation means.

Further alternatively or additionally, the first evaluation unit may also determine the current and/or future utilization of the bus system on the basis of a predefined data specification for the bus system, also referred to below as bus configuration. The bus configuration preferably comprises all information about a possible data communication on a respective bus system. In the context of the CAN bus system, this may relate in particular to information about the structure of transmittable data packets (also referred to as messages), about transmitters and receivers of respective messages, about transmission priorities of respective messages, about respective transmission time points of respective messages (cyclic, event-controlled), about minimum transmission intervals between messages, etc. Such a bus configuration may be provided to the first evaluation unit, for example, in the form of data stored in the memory unit (for example, a database), such that the first evaluation unit may carry out a theoretical calculation for the current and/or future utilization of the bus system on the basis of these data.

It should be noted that one focus of the method according to some embodiments when determining the current and/or future utilization of the bus system is on determining transmission time points or transmission time periods of cyclic messages. As described above, event-controlled messages can generally be evaluated only to a limited extent with respect to the evaluation of the utilization of the bus system. Instead, the method may preferably be used to transmit event-controlled messages in a suitable manner on the bus system in such phases in which there is little or no utilization of the bus system on the basis of cyclic messages.

In a second step of the method, a second piece of information representing respective data transmission time periods for a plurality of bus subscribers which transmit data by means of the bus system is determined as a function of the first piece of information. This process, which has already been partially described in the first method step, provides for evaluating the first piece of information determined by the first evaluation unit and representing the current and/or future utilization of the bus system, by means of a suitable algorithm, in such a way that suitable time periods are determined in which only a low utilization of the bus system exists or is to be expected. For this purpose, for example, a predefined threshold value for a utilization of the bus system may be stored in the memory unit connected to the first evaluation unit. On the basis of this predefined threshold value for the utilization of the bus system, the first evaluation unit can determine corresponding time periods in which a value for a current and/or future utilization of the bus system falls below the predefined threshold value for the utilization of the bus system. The suitable data transmission time periods for the plurality of bus subscribers determined in this manner may in turn be stored in the memory unit connected to the first evaluation unit in the form of data representing the second piece of information. In this context, it should be noted that the bus load manager and the plurality of bus subscribers may respectively have similar and/or identical electronic or electrical components, and that the bus manager basically represents another bus subscriber. In order to simplify the distinction between the specific function of the bus load manager and the function of other bus subscribers, the term differentiation selected here is correspondingly used in this description.

The second piece of information may alternatively or additionally be transmitted from the bus load manager to the plurality of bus subscribers, using an alternative transmission path. In other words, according to the method according described herein for transmitting the second piece of information, the bus system of which the utilization is to be controlled on the basis of the second piece of information does not necessarily have to be used. Instead, the second piece of information may be transmitted (in a wired and/or wireless manner) between the bus load manager and the bus subscribers via any other communication connection in terms of information technology. This provides, inter alia, the advantage that the utilization of the bus to be controlled is not influenced by the additional data communication due to the method.

In a third step of the method, the second piece of information is transmitted to the plurality of bus subscribers by means of the bus system. Using the example of the CAN bus system, this may take place in such a way that the first evaluation unit transmits one or several messages provided for transmitting the second piece of information and comprising the second piece of information, to the plurality of bus subscribers, by means of the first bus interface. This may take place in the form of a directed transmission in which the first evaluation unit transmits individual messages comprising the second piece of information individually to each respective affected bus subscriber. Alternatively or additionally, this may also take place in the form of a so-called broadcast transmission, in which the first evaluation unit transmits the second piece of information on the basis of a broadcast message addressed to all affected bus subscribers. In this context, it should be noted that neither the directed transmission nor the broadcast transmission has to be limited to the use of individual messages for the transmission of the second piece of information. In particular, if a data volume representing the second piece of information is greater than the transmittable useful data volume (payload) of a single message, it may be useful or necessary to transmit the second piece of information distributed over a plurality of individual messages (preferably by using a suitable transport protocol). The approach described here for the CAN bus system for transmitting the second piece of information may be applied analogously or at least in a similar manner to other bus systems which may be used in the transportation means, taking into consideration respective bus system characteristics.

Furthermore, it is also conceivable that the first evaluation unit determines a plurality of second pieces of information in the preceding second method step, wherein the respective second pieces of information of the plurality of second pieces of information may differ from one another completely or at least partially. Such an approach may advantageously be used to provide individual bus subscribers and/or groups of bus subscribers with respectively adjusted second pieces of information. In this manner, the control of the utilization of the bus system according to this embodiment can be permanently or temporarily limited to individual bus subscribers. Alternatively or additionally, different data transmission time periods can also be specified in this way for the individual bus subscribers and/or groups of bus subscribers. Furthermore, by using different second pieces of information, the groups of bus subscribers themselves can also be specified, wherein respective group memberships of bus subscribers can also be changed dynamically in this way. In addition, numerous other advantages may result from the use of individually adjusted second pieces of information (inter alia, individually assigned maximum data transmission rates, etc.).

In a fourth step of the method, respective data transmission time periods for the plurality of bus subscribers are adjusted by the respective bus subscribers, as a function of the second piece of information. Specifically, this means that the identical or different second piece of information received in the respective bus subscribers may be evaluated by means of second evaluation units of the respective bus subscribers. The term "second evaluation unit" is used here to represent all evaluation units involved in the data communication of the bus system which do not constitute the evaluation unit of the bus manager. However, the uniform use of the term is not intended to imply that all second evaluation units must have an identical technical design and/or must execute identical computer programs. On the basis of the second piece of information present in the respective bus subscribers, the respective second evaluation units may correspondingly determine or adjust suitable data transmission time periods for future data transmissions by means of the respective bus subscribers. As described above, this relates in particular to the adjustment of data transmission time periods for the transmission of event-controlled messages, but may also be used for adjusting data transmission time periods of cyclic or other messages (for example, "mixed-mode" messages which can be transmitted both cyclically and in an event-controlled manner).

In a fifth step of the method, the plurality of bus subscribers transmits data within the respective adjusted data transmission time periods by means of the bus system. As described above, the respective adjusted data transmission time periods may differ between the plurality of bus subscribers, provided that second pieces of information which differ from one another have been transmitted to the respective bus subscribers. If an identical second piece of information is provided to each bus subscriber, respective data transmissions of the plurality of bus subscribers may also take place within identical transmission time periods. In addition, mixed solutions may also be used which provide common data transmission time periods for the plurality of bus subscribers and/or groups of bus subscribers, as well as individual data transmission time periods for the respective bus subscribers.

In an advantageous embodiment, the second piece of information comprises a piece of information about a start time point and/or an end time point for a data transmission time period, and/or a start time point and/or end time point for a time period without data transmission. Respective start or end time points may be relative time points which, for example, relate to a reception time point of the second piece of information in the plurality of bus subscribers. Alternatively, they may also represent absolute time points which, for example, relate to a system time shared by all bus subscribers. Alternatively or additionally, the second piece of information may comprise a piece of information about a category of data which are transmitted within the adjusted data transmission time periods. Here, categories include, inter alia, transmission priorities and transmission types (for example, cyclic, event-controlled, segmented, etc.) for respective data. Further alternatively or additionally, the second piece of information may comprise a piece of information about an identifier for a bus subscriber and/or a group of bus subscribers, in order, for example, to be able to address them individually. Further alternatively or additionally, the second piece of information may comprise a piece of information about a maximum permissible data volume for a data transmission, and/or a mandatory or an optional execution of the data transmission within the suitable data transmission time periods.

In a further advantageous embodiment, the determination of the second piece of information takes place on the basis of future bus usage time periods of respective bus subscribers. Respective bus usage time periods may result, for example, in that individual bus subscribers are activated only on demand, or participate in the bus communication only on demand. If the first evaluation unit of the bus load manager has corresponding information, in particular about regularly recurring bus usage time periods of respective bus subscribers, the first evaluation unit may advantageously take said information into consideration when determining suitable future data transmission time periods. Alternatively or additionally, the determination of the second piece of information may also take place on the basis of future driving situations of the transportation means, and/or on the basis of a current route of the transportation means, and/or on the basis of the future environmental conditions relating to the transportation means. A future driving situation may, for example, be a parking operation of the transportation means, by means of which a plurality of environmental sensors (for example, ultrasonic sensors) of a parking assistance system are activated during a manually, semi-automatically, or fully automatically executed parking operation. Within this time period, a correspondingly higher utilization of the bus system by the plurality of environmental sensors may be expected. A time period for such a future parking operation may, for example, be estimated with the aid of a current route guidance for the transportation means. In addition, on the basis of route information which may be provided to the first evaluation unit, for example, by a navigation system of the transportation means, the first evaluation unit may determine further events which are likely to occur and which affect a utilization of the bus system (for example, a stop-and-go situation due to a preceding traffic jam, etc.). In addition, unfavorable environmental conditions in the vicinity of the transportation means, for example, heavy rain, fog, smoke, etc., may cause additional assistance systems of the transportation means to be manually and/or automatically activated, whereby a utilization of the bus system may also be increased. Alternatively or additionally, the second piece of information may also take place as a function of a future data transmission requirement of respective bus subscribers. Such a data transmission requirement may, for example, occur when activating the on-board electrical system of the transportation means, if the plurality of bus subscribers exchange initialization data and/or configuration data with one another. In this context, such predictable high utilizations of the bus system may be equalized at respective time points by means of the method according to at least some embodiments.

In a further advantageous embodiment, the determination of the second piece of information may be carried out on the basis of a self-learning system. In other words, the second pieces of information to be determined for controlling the utilization of the bus system may be independently determined or adjusted by means of the first evaluation unit during the course of one or several training journeys, and/or during the course of a regular use of the transportation means. The self-learning system may, for example, be implemented on the basis of an artificial neural network which is known from the prior art.

In a further advantageous embodiment, a data packet to be transmitted is divided, as a function of the second piece of information, into suitable partial data packets which are transmitted sequentially by means of the bus system, in accordance with the adjusted data transmission time periods. This means that, in particular, data packets of which the data volume exceeds a useful data volume of a single message of the respective bus system (for example, 8 bytes in the CAN bus system) must be segmented into correspondingly smaller partial data packets before transmission by means of the bus system. By using a transmission protocol known from the prior art, for example, ISO-TP, etc., the individual partial data packets can be reassembled in a respective receiver to form a complete data packet. In particular, if very large data quantities are to be transmitted by means of such a segmented data transmission, transmission pauses caused or forced by the method during the transmission of such data packets may result in it not being possible to transmit and/or receive the individual partial data packets completely (for example, due to handshake timeouts, an overwritten transmission buffer and/or reception buffer, etc.). The method of this embodiment therefore proposes a transmission protocol which is extended in comparison to the prior art, and which allows frequent and/or longer-term interruptions of a segmented data transmission. Either a completely newly developed transmission protocol or a correspondingly extended transmission protocol from the prior art may be used for this purpose. In this way, it may be ensured that the transmission of large to very large data packets by means of the bus system can be equalized without a loss of messages, in such a way that utilization peaks of the bus system can be reduced or completely avoided. A resulting more uniform utilization of the bus system may advantageously be used to increase a maximum value of an average utilization of the bus system when modeling the bus system, whereby a higher overall transmission volume can be achieved by means of the bus system according to at least some embodiments.

According to a second aspect, a bus system is proposed for controlling a utilization of the bus system of a transportation means. The bus system comprises a bus load manager, which may be a component of an existing control unit (for example, a gateway control unit), or which may be an independent control unit of the transportation means, and which comprises a first evaluation unit and a first bus interface of the bus system. The first evaluation unit may, for example, be designed as an ASIC, FPGA, processor, digital signal processor, microcontroller, or the like, and may be connected in terms of information technology to an internal and/or external memory unit, in which data which are received and/or calculated by the first evaluation unit can be stored for subsequent processing. Furthermore, the first evaluation unit may be configured to carry out the above-described method steps on the basis of a computer program implementing the method steps. The first bus interface may, for example, be an interface to a CAN, MOST, LIN, FlexRay, or Ethernet bus system. The bus load manager may be connected in terms of information technology to a plurality of bus subscribers of the bus system, by means of the bus system. The plurality of bus subscribers comprises a second evaluation unit and a second bus interface of the bus system in each case. The second evaluation unit and the second bus interface may preferably be designed in a manner analogous to the first evaluation unit and the first bus interface of the bus load manager. The first evaluation unit is furthermore configured, in connection with the bus interface, to determine a first piece of information representing a current and/or a future utilization of the bus system. The first evaluation unit is additionally configured to determine a second piece of information representing respective data transmission time periods for the plurality of bus subscribers which transmit data by means of the bus system, as a function of the first piece of information. In addition, the first evaluation unit is configured, in connection with the first bus interface, to transmit the second piece of information to the plurality of bus subscribers. The respective second evaluation unit of the plurality of bus subscribers is respectively configured to adjust respective data transmission time periods as a function of the second piece of information and, in connection with the respective second bus interface, to transmit data within the respective adjusted data transmission time periods by means of the bus system.

According to a third aspect, a transportation means is proposed which comprises a bus system according to the second-mentioned aspect. The features, combinations of features, and the advantages resulting therefrom correspond to those described in connection with the first- and second-mentioned aspects in such a way that reference is made to the above explanations in order to prevent repetitions.

BRIEF DESCRIPTION OF THE DRAWINGS

Further details, features, and advantages will become apparent from the following description and the figures. The following are depicted.

DETAILED DESCRIPTION

Figure 1:
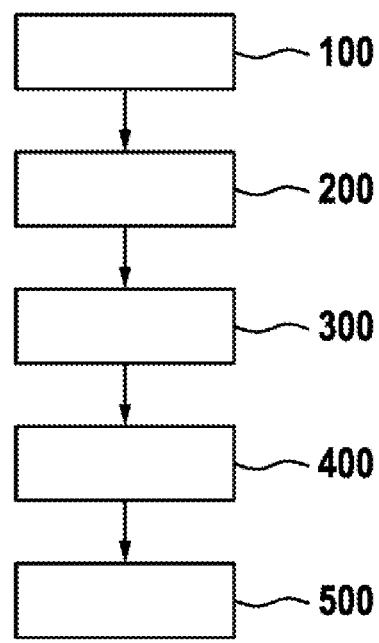
FIG. 1 depicts a flow chart illustrating steps of an exemplary embodiment of a method controlling a utilization of a bus system.

FIG. 1 depicts a flow chart illustrating steps of an exemplary embodiment of a method for controlling a utilization of a CAN bus system of a transportation means. In step 100, a first piece of information representing a future utilization of the CAN bus system is determined by means of a first evaluation unit (here, a microcontroller) of a bus load manager of the CAN bus system. For this purpose, by means of the first evaluation unit, a predefined CAN bus configuration is read out, in the form of a database representing the CAN bus configuration, from a memory unit which is connected in terms of information technology to the first evaluation unit. In step 200, the first evaluation unit determines, as a function of the first piece of information, a second piece of information representing respective suitable data transmission time periods for a plurality of bus subscribers which transmit data by means of the CAN bus system. In step 300, the first evaluation unit transmits the second piece of information, using a CAN broadcast message, simultaneously to the plurality of bus subscribers by means of the CAN bus system. In this exemplary embodiment, the plurality of bus subscribers and the bus load manager are a component of a partial on-board electrical system of the transportation means, which comprises control units for a drivetrain of the transportation means. In the fourth step 400, the plurality of bus subscribers adjusts respective data transmission time periods for future event-controlled data transmissions by the respective bus subscribers, as a function of the second piece of information. In this way, it is ensured that the event-controlled data transmissions of the respective bus subscribers take place in time periods in which only a small proportion of cyclic messages of the respective bus subscribers is transmitted on the CAN bus system. In step 500, the plurality of bus subscribers transmits event-controlled data within the respective individually adjusted data transmission time periods by means of the CAN bus system.

Figure 2:
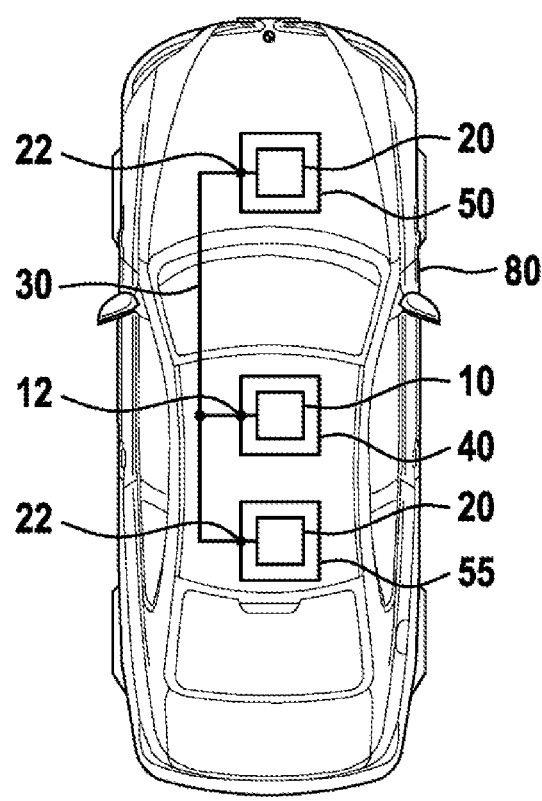
FIG. 2 depicts a schematic overview of components of a CAN bus system according to a first embodiment in connection with a transportation means.

FIG. 2 depicts a schematic overview of components of a CAN bus system 30 according to a first embodiment, in connection with a transportation means 80. The CAN bus system 30 of the first embodiment comprises a bus load manager 40, a first bus subscriber 50, and a second bus subscriber 55. The bus load manager 40 comprises a first evaluation unit 10 in the form of a microcontroller, said first evaluation unit 10 being connected in terms of information technology to the CAN bus system 30 via a first CAN bus interface 12. The first bus subscriber 50 and the second bus subscriber 55 respectively comprise a second evaluation unit 20, which is also respectively configured in the form of a microcontroller. The respective second evaluation units 20 are connected to the CAN bus system 30 in terms of information technology via the respective second CAN bus interfaces 22. The bus load manager 40, the first bus subscriber 50, and the second bus subscriber 55 are configured to carry out the method steps described above, on the basis of respective computer programs.

Figure 3:
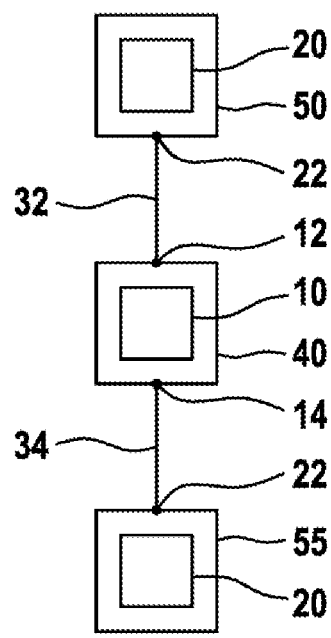
FIG. 3 depicts a schematic overview of components of a CAN bus system according to a second embodiment.

FIG. 3 depicts a schematic overview of components of a CAN bus system 30 according to a second embodiment. The components of the CAN bus system 30 depicted in the second embodiment essentially correspond to the components described in the first embodiment (without the depiction of the transportation means 80); therefore, only the differences from the first embodiment are to be described here. In this second embodiment, the bus load manager 40 is a component of a gateway control unit of the transportation means 80, said gateway control unit being configured to connect a first CAN sub-bus 32 and a second CAN sub-bus 34 to one another in terms of information technology. Here, the first bus subscriber 50 is assigned to the first CAN sub-bus 32, while the second bus subscriber 55 is assigned to the second CAN sub-bus 34. In addition to the first CAN bus interface 12 which is connected to the first CAN sub-bus 32 in terms of information technology, the first evaluation unit 10 comprises an additional third CAN bus interface 14 which is connected to the second CAN sub-bus 34 in terms of information technology. In this way, the evaluation unit 10 of the bus load manager 40 is able to determine respective first pieces of information about a utilization of the first CAN sub-bus 32 and the second CAN sub-bus 34 independently of one another, in order to be able to control a future utilization of the respective CAN sub-buses 32, 34 independently of one another, on the basis of the respective first pieces of information.

Figure 4:
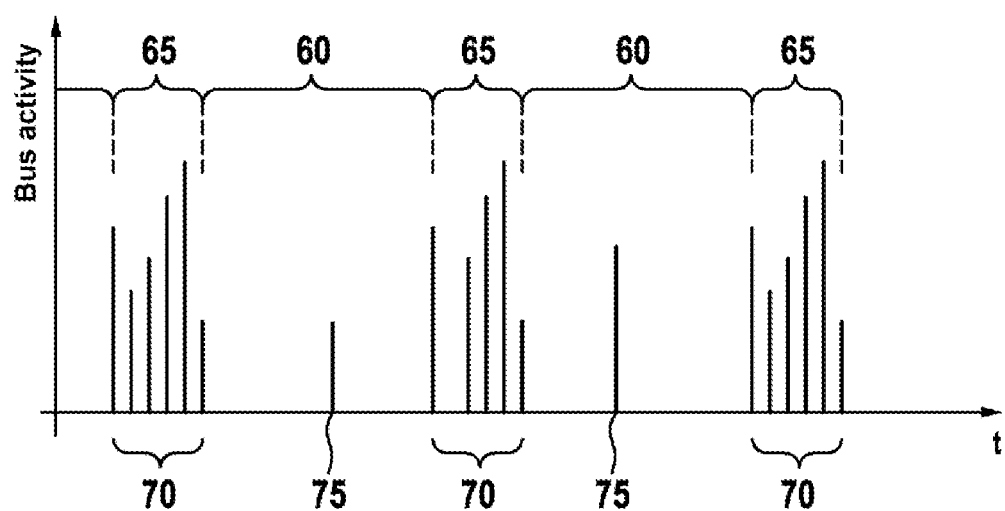
FIG. 4 depicts an example of a plurality of data transmissions by means of a CAN bus system.

FIG. 4 depicts an example of a plurality of data transmissions by means of a CAN bus system according to some embodiments. Along the time axis t in FIG. 4, a plurality of data transmissions is depicted in the form of vertical lines which represent transmission time points for respective CAN messages 70, 75. On the one hand, the plurality of data transmissions comprises cyclic CAN messages 70, and on the other hand, event-controlled CAN messages 75. On the basis of exemplary methods described herein, time periods in which respectively high and respectively low utilizations of the CAN bus system exist are determined by means of a first evaluation unit of a bus load manager of the CAN bus system, on the basis of a measurement of bus communication. The respective determined time periods are summarized in a second piece of information, in the form of recommended time periods 60 for a data transmission, and in the form of recommended time periods 65 without data transmission. The respective time periods 60, 65 represented by the second piece of information are subsequently used for carrying out or for preventing data transmissions of a plurality of CAN bus subscribers.

LIST OF REFERENCE SIGNS

10 First evaluation unit
12 First CAN bus interface
14 Third CAN bus interface
20 Second evaluation unit
22 Second CAN bus interface
30 CAN bus system
32 First CAN sub-bus
34 Second CAN sub-bus
40 Bus load manager
50 First bus subscriber
55 Second bus subscriber
60 Recommended time period for a data transmission
65 Recommended time period without data transmission
70 Cyclic CAN messages
75 Event-controlled CAN messages
80 Transportation

The invention claimed is:

1. A method for controlling a utilization of a bus system of a transportation means, comprising the steps of:
   determining a first piece of information representing a current and/or a future utilization of the bus system,
   determining a second piece of information representing respective data transmission time periods for a plurality of bus subscribers which transmit data by means of the bus system as a function of the first piece of information, wherein the determining of the second piece of information is based at least in part on at least one of the group consisting of,
      an estimation of a time period of a future parking operation;
      a current route of the transportation means, and
      future environmental conditions relating to transportation means;
   adjusting respective data transmission time periods for the plurality of bus subscribers by the respective bus subscribers, as a function of the second piece of information, and
   transmitting data by the plurality of bus subscribers within the respective adjusted data transmission time periods using the bus system.

2. The method as claimed in claim 1, wherein the bus system is an automotive bus system.

3. The method as claimed in claim 1, wherein the second piece of information comprises a piece of information about at least one of the group consisting of:
   a start time point and/or an end time point for a data transmission time period;
   a start time point and/or an end time point for a time period without a data transmission;
   a category of data which are transmitted within the adjusted data transmission time periods;
   an identifier for a bus subscriber and/or a group of bus subscribers;
   a maximum permissible data volume for a data transmission; and
   a mandatory or an optional execution of the data transmission within the suitable data transmission time periods.

4. The method as claimed in claim 3, wherein the second piece of information for each bus subscriber of the plurality of bus subscribers:
   is identical; or
   is determined individually and/or transmitted individually to said bus subscriber.

5. The method as claimed in claim 4, wherein the determination of the first piece of information takes place based at least in part on
   a predefined bus configuration; and/or
   a measurement of the current utilization of the bus system.

6. The method as claimed in claim 1, wherein the second piece of information for each bus subscriber of the plurality of bus subscribers:
   is identical; or
   is determined individually and/or transmitted individually to said bus subscriber.

7. The method as claimed in claim 6, wherein the determination of the second piece of information further takes place based at least in part on at least one of the group consisting of:
   future bus usage time periods of respective bus subscribers; and
   a future data transmission requirement of respective bus subscribers.

8. The method as claimed in claim 1, wherein the determination of the first piece of information takes place based at least in part on:
   a predefined bus configuration; and/or
   a measurement of the current utilization of the bus system.

9. The method as claimed in claim 1, wherein the determination of the second piece of information further takes place based at least in part on at least one of the group consisting of:
   future bus usage time periods of respective bus subscribers; and
   a future data transmission requirement of respective bus subscribers.

10. The method as claimed in claim 1, wherein the determination of the second piece of information is carried out on the basis of a self-learning system.

11. The method as claimed in claim 1, wherein a data packet to be transmitted is divided, as a function of the second piece of information, into suitable partial data packets which are transmitted sequentially by means of the bus system in accordance with the adjusted data transmission time periods.

12. The method as claimed in claim 1, wherein the bus system is an automotive bus system, the automotive bus system comprising an Ethernet bus system.

13. The method as claimed in claim 1, wherein the bus system comprises a CAN bus system.

14. The method as claimed in claim 1, wherein the determination of the first piece of information takes place based at least in part on a measurement of the current utilization of the bus system.

15. The method as claimed in claim 14, wherein the determination of the first piece of information takes place based at least in part on a predefined bus configuration.

16. The method as claimed in claim 1, wherein the determining of the second piece of information is based at least in part on a current route of the transportation means.

17. The method as claimed in claim 16, wherein the determining of the second piece of information is based at least in part on future environmental conditions relating to transportation means.

18. The method as claimed in claim 1, wherein the determining of the second piece of information is based at least in part on future environmental conditions relating to transportation means.

* * * * *